Aug. 8, 1950 C. W. EARP 2,517,550

ELECTRICAL MULTIVIBRATOR CIRCUITS

Filed Sept. 7, 1945

Inventor
CHARLES WILLIAM EARP
By [signature]
Attorney

Patented Aug. 8, 1950 2,517,550

UNITED STATES PATENT OFFICE 2,517,550

ELECTRICAL MULTIVIBRATOR CIRCUITS

Charles William Earp, London, England, assignor, by mesne assignments, to International Standard Electric Corporation, New York, N. Y., a corporation of Delaware Application September 7, 1945, Serial No. 614,953
In Great Britain September 15, 1944

3 Claims. (Cl. 250—36)

Figure 1:
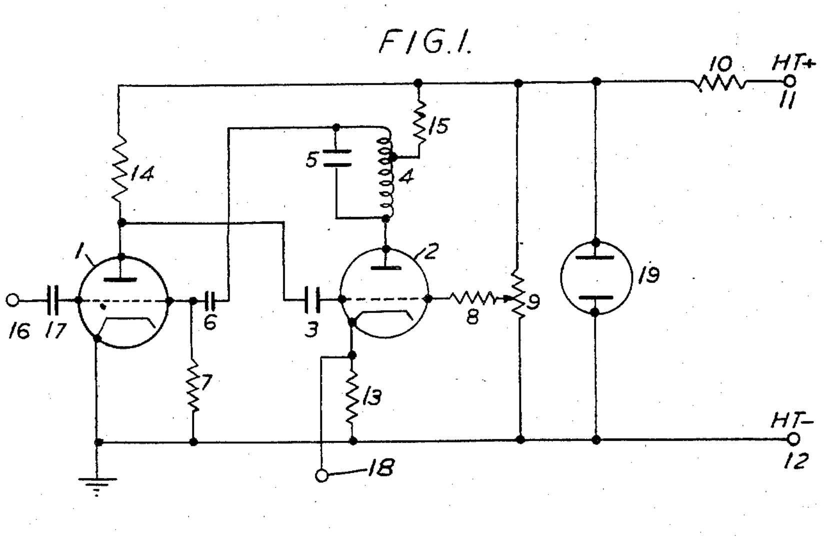

The present invention relates to means for stabilising electrical multivibrator circuits.

Electrical multivibrator circuits comprising two cross-connected electron discharge devices or valves are well known. In such circuits, the anode of the first valve is coupled to the control grid of the second, and the anode of the second valve is coupled to the control grid of the first, by means of respective impedance couplings; and each coupling may comprise, for example, a condenser-resistance combination, whose time constant determines the period of oscillation of the multivibrator circuit arrangement. One or more cathode follower or other amplifier stages may be included in the coupling between the two valves.

Such circuits are often employed for the production of electrical pulses of substantially constant repetition frequency, the pulses being of substantially rectangular wave form. However, when, for example, the pulses are to be employed for opening a gating circuit for selecting a particular desired pulse train in a received signal to the exclusion of other pulse trains of the same or different frequency, and for eliminating interference, the usual circuit as described is not sufficiently stable and constant in frequency, and some synchronising and stabilising means must be provided. A full description of the causes of instability of a controlled multivibrator is given in my British Patent No. 583,262, issued June 18, 1947, entitled "Production, Selection and Demodulation of Pulse Trains" from which it will be observed that the frequency range over which an unstabilised multivibrator circuit can be synchronised depends very considerably on the amplitude of the controlling signal.

A number of stabilising arrangements have been proposed employing, for example, a resonant circuit of small damping connected somewhere in the multivibrator circuit and adapted to be excited by the pulses generated so that a slowly decaying sine wave is superposed on the control grid potential wave. The circuit is tuned to a frequency considerably higher than the multivibrator frequency and practically determines the time of triggering of the circuit. Sometimes two resonant circuits tuned to different frequencies are used, but in any of these cases, the stabilisation is not good enough when, for example, the multivibrator is to be used to provide gating pulses for the selection of a pulse train from several pulse trains with repetition frequencies very nearly equal.

In the multivibrator circuit utilising a single resonant circuit tuned to an appropriate frequency, which is usually several times the multivibrator frequency, and which for convenience will be called the ringing frequency, the resonant circuit may conveniently be included in series with the anode of one of the valves, which anode is coupled to the control grid of the other valve by a condenser. In other words the said grid and anode are coupled to the same point of the resonant circuit.

In such a multivibrator system there is a limitation to the amount of frequency control that can be imposed by the resonant circuit. In order to make this resonant circuit exercise a maximum of control it is desirable that a large ringing frequency voltage should be used. If, however, this condition is encouraged by the use of a tuned resonant circuit of very high dynamic impedance, a continuous oscillation at the ringing frequency is liable to be set up, with the result that the normal action of the multivibrator is destroyed, the triggering action from one condition to the other being no longer controlled by the time constants of the grid-anode cross-coupling circuits, but by the ringing frequency voltage.

It is the principal object of this invention to remove this disadvantage while increasing the amount of stabilising control in a multivibrator utilising a single resonant controlling circuit. This object is attained according to the present invention by providing means for connecting the resonant circuit in such manner as to introduce negative feedback at the ringing frequency.

The invention will be described with reference to Fig. 1 of the accompanying drawing which shows a schematic circuit diagram of an embodiment. Fig. 2 shows a minor modification of part of Fig. 1.

Figure 2:
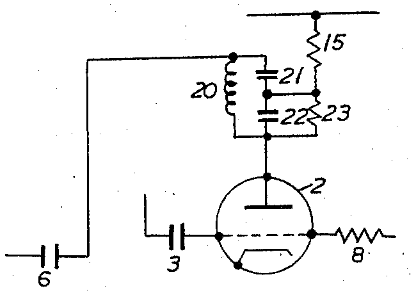

In Fig. 1, the triode valve 1 has its anode connected to the control grid of the valve 2 through a condenser 3. The anode of 2 is connected to the control grid of 1 through a parallel resonant circuit comprising a tapped inductance 4 and a condenser 5, and through a condenser 6. The control grid of the valve 1 is connected to ground through a resistance 7 and that of valve 2 is connected through a resistance 8 to an adjustable contact on a biassing resistance potentiometer 9 connected in series with a resistance 10 across the terminals 11 and 12 intended for the high tension operating source. The cathode of valve 1 is grounded and that of valve 2 is connected to earth through a load resistance 13. The anode of valve 1 is supplied with current from the positive high tension terminal 11 through a resistance 14, and that of valve 2 is supplied through a resistance 15 connected to the tap on the inductance 4. A terminal 16 connected to the control grid of the valve 1 through a condenser 17 is provided for the application of synchronising signals. A terminal 18 is connected to the cathode of valve 2, and serves as the output terminal for the pulses generated by the multivibrator. A neon tube 19 for stabilising the operating voltage is shunted across the resistance 9.

The circuit which has just been described is a modification of a known circuit in which the condenser 6 is connected directly to the anode of the valve 2, and in which the resistance 15 is connected to the upper end of the inductance 4, instead of to the tap, as shown. This modification of the known arrangement introduces negative feedback at the natural frequency of the resonant circuit 4, 5, which prevents the circuit from generating sustained oscillations, this being the distinguishing feature of the present invention.

In the circuit of the Fig. 1, the capacity of the condenser 6 will be small compared with that of condenser 3, so that the valve 1 will be in a conducting condition for the major portion of the period of the multivibrator, the valve 2 conducting only for the remainder of this period. Thus short substantially rectangular pulses will be obtained from terminal 18.

It is well known that in the absence of the resonant circuit 4, 5 (the condenser 6 and resistance 15 both being connected directly to the anode of the valve 2), the voltage applied to the control grid of the valve 2 goes through the following cycle:

(*a*) A short period at a positive value, during which the potential of the other control grid is rising logarithmically from a negative value.

(*b*) A sudden very sharp fall to a large negative value, cutting off the valve 2.

(*c*) A slow logarithmic rise occupying the major portion of the period, the rate being determined by the relatively large time constant of the condenser 3 and the associated resistances, until current begins to flow in the valve 2, when there occurs (*d*) A sudden very sharp rise to the positive value of condition (*a*).

The total period of a multivibrator of this kind, in which the valve 1 is conducting for most of the time, is determined principally by the duration of condition (*c*), and synchronisation or stabilisation is therefore usually effected by controlling this stage of the oscillation. Such control may be produced by applying synchronising pulses directly to the control grid of valve 2, but they are preferably applied in negative sense to the control grid of valve 1, as shown in Fig. 1, and they will then appear amplified and in positive sense on the control grid of valve 2.

As already stated, it is well known to stabilise the multivibrator by connecting a resonant circuit simply in series with the anode resistance 15. The resonant circuit should be tuned to a frequency from about five to ten times the oscillation frequency of the multivibrator. It need not be an exact multiple of the multivibrator frequency. The short pulses of anode current in valve 2 shock-excite the resonant circuit, and since when the valve is cut off, the load on the resonant circuit connected through the condenser 6 and through the resistance 15 will be quite small, the resonant circuit will ring with relatively small damping at its resonance frequency.

The ringing voltage will be applied to the control grid of the valve 1 and will be amplified thereby (since this valve is conducting during the stage (*c*), the control grid having a slight positive potential) and will be applied to the control grid of valve 2, the potential of which is slowly rising during this stage of the cycle. Triggering of the valve 2 occurs during a positive upstroke of one of the ringing cycles, so that the length of stage (*c*) will be largely determined by the tuning of the resonant circuit, and the stability will be much improved. It has, however, been found that the known arrangement just described fails when an attempt is made to provide a high degree of control by the resonant circuit. In order to provide a dominating control by the ringing voltage, the dynamic impedance of the resonant circuit should be high. If, however, this impedance is not relatively small compared with the resistance 15, the circuit will oscillate at the natural frequency of the resonant circuit, neither of the valves being cut off for more than a fraction of the ringing period. It can easily by seen that since the phase shift through each valve is about 180°, the conditions are just those necessary for oscillation, which will take place unless the resistance 15 is sufficiently large to cause the cutting off of valve 2 during the period (*c*) for at least several ringing periods so that positive feedback is prevented.

In the arrangement according to the invention which is shown in Fig. 1, the phase of the ringing voltage is reversed before application to the control grid of valve 1, (condenser 6 being connected to the end of the element 4 remote from the anode) so that if both grids should be able to control at any point in the multivibrator cycle, the feedback at the ringing frequency would be negative, and so oscillations would be prevented, and the resonant circuit may now have an impedance large compared with the resistance 15, giving increased control, as explained. The operation of the control is exactly as before, triggering occurring on a positive upstroke of a ringing cycle.

Fig. 2 shows a minor modification of the connections of the resonant circuit, in which the resistance 15 is connected effectively to a tap on the condenser instead of on the inductance. The remainder of the multivibrator may be the same as in Fig. 1. The resonant circuit comprises an inductance 20, which can be untapped, shunted by two condensers 21 and 22 connected in series, the resistance 15 being connected to the junction point. In order to provide a path for the anode current of valve 2, the condenser 22 is shunted by a resistance 23, which may be made large, of the outer of 500,000 ohms, for example, so that it does not damp the resonant circuit appreciably. It is to be noted that since the anode current only flows for very short periods in the valve 2, the average value is very small, and the surges will be passed by the condenser 22.

As in Fig. 1, the condenser 6 is connected to the end of the inductance which is remote from the anode, and so the feedback will be negative.

By the use of the arrangement according to the invention, it has been found possible to increase the degree of control by the resonant circuit to about three times the amount possible by the known resonant circuit stabilising arrangement referred to. With a well stabilised power supply it is possible to obtain a frequency stability of better than $\frac{1}{10}$ per cent. This provides a signal gate which can be open only for about ⅕ per cent of the time; and the multivibrator may be used as a stable frequency divider with a dividing factor up to about 500.

What is claimed is:

1. A stabilised electric multivibrator comprising two amplifying valves, a parallel resonant stabilising circuit connected to the anode of one of the said valves, a resistance connecting the positive terminal of an anode current source to an intermediate point on one of the elements of the parallel resonant circuit, a condenser directly connecting the control grid of the other valve to that terminal of the parallel resonant circuit which is remote from the anode of the first-mentioned valve, a second condenser connecting the control grid of the first-mentioned valve to the anode of the other valve, a second resistance connecting the anode of the said other valve to the said positive terminal, and third and fourth resistances respectively connecting the control grids of the said valves to the negative terminal of the said source.

2. A multivibrator according to claim 1 in which the parallel resonant circuit comprises a condenser shunted by an inductance having an intermediate tap, the first-mentioned resistance being connected to the said tap.

3. A multivibrator according to claim 1 in which the parallel resonant circuit comprises an inductance shunted by two series-connected condensers, the first-mentioned resistance being connected to the junction point of the said condensers, another resistance being connected between the said junction point and the anode of the first-mentioned valve.

CHARLES WILLIAM EARP.

REFERENCES CITED

The following references are of record in the file of this patent:

UNITED STATES PATENTS

| Number | Name | Date |
|---|---|---|
| 2,182,555 | Geiger | Dec. 5, 1939 |
| 2,413,956 | Coykendall | Jan. 7, 1947 |
| 2,419,772 | Gottier | Apr. 29, 1947 |
| 2,426,996 | Goodall | Sept. 9, 1947 |

FOREIGN PATENTS

| Number | Country | Date |
|---|---|---|
| 296,827 | Great Britain | Sept. 13, 1928 |
| 415,804 | Great Britain | Sept. 6, 1934 |